United States Patent
Grau

(10) Patent No.: US 10,956,269 B2
(45) Date of Patent: Mar. 23, 2021

(54) ELECTRONIC DATA-DISTRIBUTION CONTROL UNIT AND METHOD FOR OPERATING SUCH A CONTROL UNIT

(71) Applicant: Robert Bosch GmbH, Stuttgart (DE)

(72) Inventor: Olaf Grau, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 16/287,433

(22) Filed: Feb. 27, 2019

(65) Prior Publication Data

US 2019/0266055 A1   Aug. 29, 2019

(30) Foreign Application Priority Data

Feb. 28, 2018 (DE) .......................... 102018203001.4

(51) Int. Cl.
*G06F 11/00* (2006.01)
*G06F 11/14* (2006.01)
*H04L 12/939* (2013.01)

(52) U.S. Cl.
CPC ........ *G06F 11/142* (2013.01); *G06F 11/1423* (2013.01); *H04L 49/557* (2013.01)

(58) Field of Classification Search
CPC .............. G06F 11/142; G06F 11/1423; G06F 11/1625; G06F 11/2007; G06F 11/2012; H04L 49/557; H04L 49/65
See application file for complete search history.

(56) References Cited

U.S. PATENT DOCUMENTS 6,662,234 B2 *  12/2003  Cheng .................... H04L 12/12
709/250

* cited by examiner

*Primary Examiner* — Marc Duncan
(74) *Attorney, Agent, or Firm* — Norton Rose Fulbright US LLP; Gerard Messina

(57) ABSTRACT

A method and a device for operating an electronic data-distribution control unit for a media access to a medium for the transmission of data, data being transmitted from a first physical interface for a first port in the data-distribution control unit to a second physical interface for a second port in the data-distribution control unit via a first media-independent interface between a media access control in the data-distribution control unit and the first physical interface and via a second media-independent interface between the media access control and the second physical interface, a case of a fault in the media access control being detected if a communication between the media access control and a monitoring logic in the data-distribution control unit fails, the monitoring logic, in the case of a fault, configuring the first physical interface and the second physical interface to transmit data via a third media-independent interface between the first physical interface and the second physical interface, without the media access control.

13 Claims, 2 Drawing Sheets

ELECTRONIC DATA-DISTRIBUTION CONTROL UNIT AND METHOD FOR OPERATING SUCH A CONTROL UNIT

FIELD OF THE INVENTION

The present invention relates to an electronic data-distribution control unit, particularly for an Ethernet network according to a standard from the family of IEEE 802.3 standards.

BACKGROUND INFORMATION

In such a data-distribution control unit, the access to physical interfaces for transmitting data via a medium in operation is usually controlled by a media access control. In the Ethernet, a physical interface in the Ethernet physical layer is denoted by PHY. The media access control in the Ethernet media access control layer is denoted by MAC.

The PHY and MAC are semiconductor components which are disposed separately from each other in the data-distribution control unit. If the MAC fails because of a fault, the data-distribution control unit is no longer able to distribute data via the MAC, since the access to the PHY can no longer be controlled by the MAC. The transmission of data by the data-distribution control unit is then interrupted.

The object of the present invention is to enable a more reliable transmission of data, or data transmission in case of a fault.

SUMMARY

This is achieved by the data-distribution control unit and the method for operating such a control unit. A corresponding computer program with instructions for carrying out the method by a computer and a computer-program product, on which the computer program is stored, are likewise provided.

With respect to the method for operating an electronic data-distribution control unit for a media access to a medium for the transmission of data, it is provided that data are transmitted from a first physical interface for a first port in the data-distribution control unit to a second physical interface for a second port in the data-distribution control unit via a first media-independent interface between a media access control in the data-distribution control unit and the first physical interface and via a second media-independent interface between the media access control and the second physical interface, a case of a fault in the media access control being detected if a communication between the media access control and a monitoring logic in the data-distribution control unit fails, the monitoring logic, in the case of a fault, configuring the first physical interface and the second physical interface to transmit data via a third media-independent interface between the first physical interface and the second physical interface, without the media access control. Consequently, an alternative data path is activated as soon as a case of fault is detected in the media access control. The transmission of data by the data-distribution control unit is thus continued.

Advantageously, the fault case is detected as a function of a signal level on an interface circuit between the media access control and the monitoring logic. The monitoring logic is able to monitor the media access control via a signal level in a handshake. The handshake is thus realized as hardware flow control by corresponding signal levels on associated interface circuits.

In case of a fault, the monitoring logic advantageously triggers a reset of the first physical interface and the second physical interface, by which the first physical interface and the second physical interface are restarted, upon starting, at least one first communication parameter of the first physical interface being configured according to a first electrical resistance configuration, and at least one second communication parameter of the second physical interface being configured according to a second electrical resistance configuration. For example, the same resistance configuration is used which is used, e.g., during the start of the data-distribution control unit, before the media access control is activated, in order to permit the communication between the first port and the second port.

In order to detect the fault case, the monitoring logic and the media access control advantageously exchange at least one signal for a software or hardware handshake. It is thereby checked in determinate fashion, whether the case of fault has occurred.

With respect to the electronic data-distribution control unit for a media access to a medium for the transmission of data, it is provided that the data-distribution control unit includes a first physical interface for a first port in the data-distribution control unit, a second physical interface for a second port in the data-distribution control unit and a media access control, the data-distribution control unit being designed to transmit data from the first physical interface to the second physical interface via a first media-independent interface between the media access control and the first physical interface and via a second media-independent interface between the media access control and the second physical interface, the data-distribution control unit including a monitoring logic which is designed to detect a case of fault in the media access control if a communication between the media access control and the monitoring logic in the data-distribution control unit fails, the monitoring logic being designed, in the case of a fault, to configure the first physical interface and the second physical interface to transmit data via a third media-independent interface between the first physical interface and the second physical interface, without the media access control. The data-distribution control unit may thus be employed in a series connection, i.e., in a daisy chain, of a plurality of data-distribution control units, without the data transmission being interrupted in the event of a fault in the media access control.

The monitoring logic is designed advantageously to detect the fault case as a function of a signal level on an interface circuit between the media access control and the monitoring logic. This increases the failure safety of the data transmission, since the signal level is monitored from outside of the media access control.

Advantageously, in the case of a fault, the monitoring logic is designed to trigger a reset of the first physical interface and the second physical interface, the first physical interface and the second physical interface being designed to restart owing to the reset, the first physical interface being designed, upon starting, to configure at least one first communication parameter of the first physical interface according to a first electrical resistance configuration, and the second physical interface being designed to configure at least one second communication parameter of the second physical interface according to a second electrical resistance configuration. The reset is triggered from outside of the media access control. This makes it possible to implement the reset even in the event of major faults in the hardware of the media access control or the power supply for the media access control.

Advantageously, the monitoring logic and the media access control are designed to exchange at least one signal for a software or hardware handshake, in order to detect the fault case. This determinate check improves the reliability of the monitoring, since the time intervals for the cyclical check are selectable to match the demands on the data transmission.

DETAILED DESCRIPTION

Figure 1:
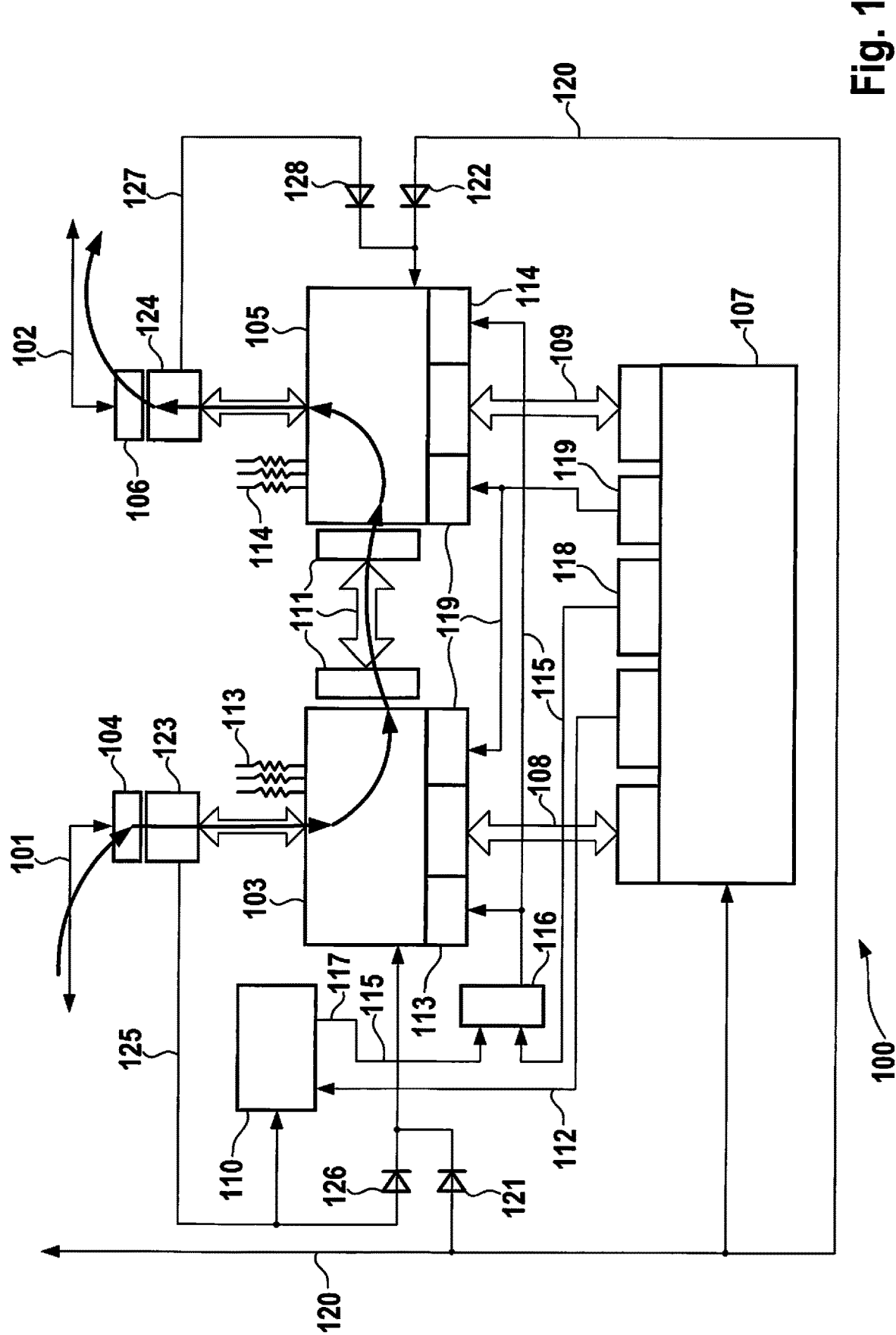
FIG. 1 shows schematically, parts of an electronic data-distribution control unit.

FIG. 1 shows schematically, parts of an electronic data-distribution control unit 100 for a media access to a medium 101, 102 for the transmission of data.

Data-distribution control unit 100 includes a first physical interface 103 for a first port 104 in data-distribution control unit 100, which is connectable to a first medium 101. Data-distribution control unit 100 includes a second physical interface 105 for a second port 106 in data-distribution control unit 100, which is connectable to a second medium 102.

First medium 101 and second medium 102 are different media in the example. Media 101, 102 may be implemented as two inter-twisted wires, i.e., a twisted pair. It may also be a coaxial cable or an optical fiber.

Data-distribution control unit 100 includes a media access control 107.

First physical interface 103 and second physical interface 105 are implemented in the example as two semiconductor components PHY in the Ethernet physical layer.

In the example, media access control 107 takes the form of semiconductor component MAC, different from the PHY, in the Ethernet media access control layer.

Data-distribution control unit 100 is designed to transmit data from first physical interface 103 to second physical interface 105 via a first media-independent interface 108 between media access control 107 and first physical interface 103 and via a second media-independent interface 109 between media access control 107 and second physical interface 105.

First media-independent interface 108 is implemented in the example as a media-independent Ethernet interface, e.g., as a serial gigabit media-independent interface, SGMII. Second media-independent interface 109 is implemented in the example as a media-independent Ethernet interface, e.g., as a serial gigabit media-independent interface, SGMII.

SGMII is a media-independent Ethernet interface for gigabit Ethernet, which supports data rates of 10 Mbit/s, 100 Mbit/s and 1000 Mbit/s. For example, two differential line pairs, typically printed conductors, are used for transmitting data.

Optionally, one line with a clock reference may be used.

For example, the SGMII interface connects PHYs and MACs to one another on a printed circuit board. The MAC and PHY may also be disposed on different printed circuit boards and connected with a backplane connection.

In sum, either four lines or, if a clock reference is used, six lines are used for a differential data transmission.

A different media-independent interface may also be provided. xMII denotes a SGMII interface or one of the other media-independent interfaces indicated in the following.

For instance, a MII interface for 100 Mb/s and 10 Mb/s may use four data lines for receiving data, four data lines for transmitting data and eight control lines for data-flow control for transmitting and receiving, that is, in total sixteen lines with a clock-pulse rate of 25 MHz in the case of 100 Mb/s or 2.5 MHz in the case of 10 Mb/s. In that case, data are accepted only with one edge.

For example, a RMII interface for 50 Mb/s uses two data lines for receiving, two data lines for transmitting, four control lines for data-flow control for transmitting and receiving, that is, eight lines in total.

For instance, a GMII interface uses eight data lines for receiving, eight data lines for transmitting, nine control lines for data-flow control for transmitting and receiving, i.e., in sum, twenty-five lines with a clock-pulse rate of 125 MHz. In that case, data are accepted in the DDR method. That is, data are accepted on the rising and falling edge of the clock signal; the actual clock-pulse rate is 250 MHz.

For instance, a RGMII interface uses four data lines for transmitting, four data lines for receiving, four control lines for data-flow control for transmitting and receiving, i.e., a total of twelve lines with a clock-pulse rate of 125 MHz. In that case, data are transmitted in the DDR method, that is, data are accepted on the rising and falling edge of the clock signal; the actual clock-pulse rate is 250 MHz.

Data-distribution control unit 100 includes a monitoring logic 110 which is designed to detect a case of fault in media access control 107 if a communication between media access control 107 and monitoring logic 110 in the data-distribution control unit fails.

Monitoring logic 110 is designed, in case of a fault, to configure first physical interface 103 and second physical interface 105 to transmit data via a third media-independent interface 111 between first physical interface 103 and second physical interface 105, without media access control 107.

In the example, third media-independent interface 111 takes the form of a media-independent gigabit Ethernet interface, e.g., a gigabit media-independent interface, GMII, or reduced gigabit media-independent interface RGMII. A SGMII interface may also be used, especially if a PHY has two SGMII interfaces. In this case, both SGMII interfaces of the respective PHYs are used.

The GMII interface is a media-independent interface with 24 pins, which may be used with various transmission media. Data rates up to 1 Gbit/s are defined. The GMII interface uses an 8-bit interface which is clocked with 125 MHz. The data are transmitted via eight data lines in each direction. Moreover, the GMII interface has six status lines for the transmission of error signals and signals for the data integrity. The R-version RGMII uses only four data lines in each direction and has only 12 pins. The pin number and the implementation may differ, specific to the manufacturer.

The GMII interface may also operate with the data rates of the classic Ethernet of 10 Mbit/s and of the fast Ethernet with 100 Mbit/s. The transmitted data format on the GMII interface corresponds to the Ethernet frame. A MII interface may also be provided.

Monitoring logic 110 is designed to detect the fault case as a function of a signal level on an interface circuit 112 between media access control 107 and monitoring logic 110.

For example, monitoring logic 110 is realized in a semiconductor component that is disposed separately from the MAC and the PHY.

For instance, interface circuit 112 is a direct connection between a pin of the MAC and a pin of the semiconductor component for monitoring logic 110.

Monitoring logic 110 is able to monitor media access control 107 based on a signal level which is present on interface circuit 112 in a handshake. The handshake is realized as hardware flow control by corresponding signal levels on associated interface circuit 112. The pins and interface circuit 112 are also denoted hereinafter as handshake interface.

For example, the signal level may assume the states of logical 1 or logical 0. For instance, the monitoring logic recognizes the proper functioning of the MAC so long as the signal level on interface circuit 112 in the handshake at a predetermined point of time has a rising edge from logical 0 to logical 1 or a falling edge from logical 1 to logical 0.

The MAC and the semiconductor component for monitoring logic 110 are designed to determine and evaluate these signal levels at the pins.

In particular, monitoring logic 110 is designed to check media access control 107 cyclically in order to detect a case of fault and/or to exchange at least one signal of a software or hardware handshake.

In case of a fault, monitoring logic 110 is designed to trigger a reset of first physical interface 103 and second physical interface 105.

First physical interface 103 and second physical interface 105 are designed to restart owing to the reset.

First physical interface 103 is designed, upon starting, to configure at least one first communication parameter of first physical interface 103 according to a first electrical resistance configuration 113.

Second physical interface 105 is designed to configure at least one second communication parameter of second physical interface 105 according to a second electrical resistance configuration 114.

First physical interface 103 has a first reset pin 113. First physical interface 103 monitors first reset pin 113 and executes the reset if a reset signal is received. Second physical interface 105 has a second reset pin 114. Second physical interface 105 monitors second reset pin 114 and executes the reset if the reset signal is received.

First reset pin 113 and second reset pin 114 are connected with the aid of corresponding signal lines 115 via an OR-operation 116 both to a third reset pin 117 of monitoring logic 110, that is, the semiconductor component for monitoring logic 110, as well as to a PHY reset pin 118 of media access control 107, that is, of the MAC.

The further circuitry for the control is described using as example first physical interface 103, second physical interface 105 and media access control 107 shown in FIG. 1. In the example, a management data input/output, MDIO, interface 119 as serial bus interface of the Ethernet family of the IEEE 802.3 standards, connects media access control 107 and first physical interface 103 on one hand and media access control 107 and second physical interface 105 on the other hand.

A power supply 120 is implemented in the example by an external power-supply source. Media access control 107 is connectable via power supply 120 directly to the power-supply source. First physical interface 103 is connectable via a first diode 121 to power supply 120, first diode 121 being disposed in such a way that in its reverse direction, it prevents a return flow of current from first physical interface 103 in the direction of the power-supply source, media access control 107 and second physical interface 105. Second physical interface 105 is connectable via a second diode 122 to power supply 120, second diode 122 being disposed in such a way that in its reverse direction, it prevents a return flow of current from second physical interface 105 in the direction of the power-supply source, media access control 107 and first physical interface 103.

First port 104 and first physical interface 103 are connected via a first decoupler 123. Second port 106 and second physical interface 105 are connected via a second decoupler 124.

First decoupler 123 is connected via a first supply line 125 both to monitoring logic 110, that is, in the example, the semiconductor component for monitoring logic 110, as well as to first physical interface 103. A third diode 126 is disposed in such a way that in its reverse direction, it prevents both a flow of current from power supply 120, as well as a return flow of current from first physical interface 103 into monitoring logic 110 or first decoupler 123. Second decoupler 124 is connected via a second supply line 127 to second physical interface 105. A fourth diode 128 is disposed in such a way that in its reverse direction, it prevents both a flow of current from power supply 120, as well as a return flow of current from second physical interface 105 into second decoupler 124. In general, provided in this concept are additional interface 111, an example as xMII interface of the PHYs, a power over dataline, PoDL, according to the IEEE 802.3 standard, concept as well as monitoring logic 110 which monitors the MAC layer cyclically for faulty behavior.

An energy supply through medium 101, 102, e.g., as Power over Ethernet or PoDL, is therefore possible for monitoring logic 110, first physical interface 103 and second physical interface 105, even if the power-supply source via power supply 120 is not available. The transmission of data via the data-distribution control unit thus remains possible, even if media access control 107 fails because of a loss of the power supply through power supply 120.

Figure 2:
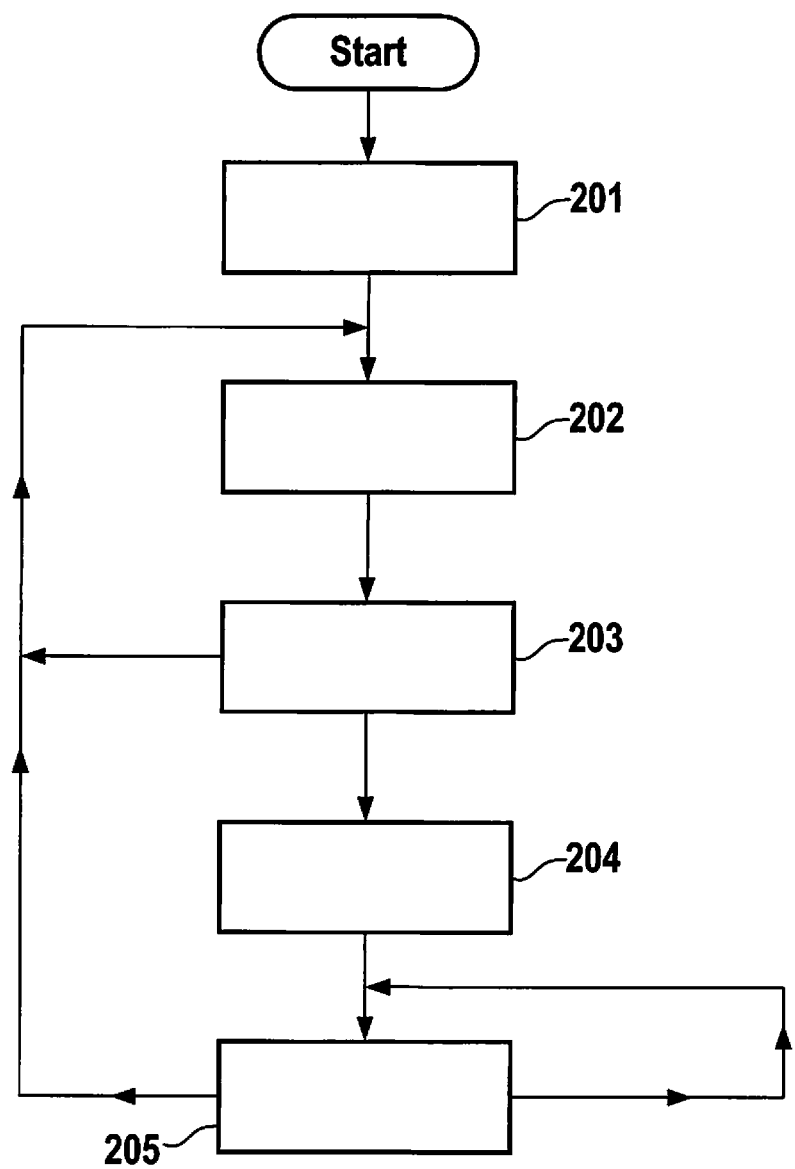
FIG. 2 shows schematically, steps in a method for operating such a control unit.

A method for operating electronic data-distribution control unit 100 for media access to medium 101, 102 for the transmission of data is described in the following with reference to FIG. 2. For example, the method automatically detects a case of fault in the MAC layer with the aid of monitoring logic 110, and in the event of a fault, activates the alternative data path. The data are then passed on from first port 104 to second port 106 without the participation of a MAC layer, and the communication flow in the overall network is maintained.

After the start, a step 201 is carried out. In step 201, after an operating voltage is applied to data-distribution control unit 100, first physical interface 103 and second physical interface 105, i.e., in the example, the PHYs, configure themselves via first resistance configuration 113 and second resistance configuration 114, respectively. A software of the μC/μP, which in the example operates an Ethernet stack and a MAC interface, is not yet active in step 201, because a certain time is necessary until this software is started, i.e., is booted.

The resistance configuration is read in immediately after the application of the operating voltage either via the connection to an external power supply or via the Ethernet line with the aid of power over dataline, PoDL.

The resistance configuration specifies communication parameters in such a way that the two PHYs function in what is termed back-to-back mode with the aid of the xMII interface. In this mode, one of the two PHYs assumes the role of the MAC interface, that is, the data now flows exclusively via the two PHYs, which are connected directly to xMII interface 111.

A step 202 is subsequently carried out.

In step 202, data are transmitted from first physical interface 103 for first port 104 in data-distribution control unit 100 to second physical interface 105 for second port 106 in data-distribution control unit 100 via first media-independent interface 108 between media access control 107 in data-distribution control unit 100 and first physical interface 103 and via second media-independent interface 109 between media access control 107 and second physical interface 105.

In the example, after successful booting of the software of the μC or μP, the two PHYs reinitialize by the overwriting of the communication parameters, which are determined originally by the resistance configuration, with the aid of MDIO interface 119. The back-to-back mode of the two PHYs, as well as the data flow via xMII interface 111, are now deactivated. Instead, the data now flows via first media-independent interface 108 and via second media-independent interface 109, that is, the SGMII interfaces of the PHY and the MAC interface of the μC/μP.

Furthermore, after the booting, monitoring logic 110 is activated. This requires a notification from the μC/μP with the aid of the handshake interface within a defined time interval. This represents the normal operation.

A step 203 is then carried out, in which a case of fault is detected in media access control 107 if a communication between media access control 107 and monitoring logic 110 in data-distribution control unit 100 fails. Monitoring logic 110 checks media access control 107 cyclically during normal operation, for example, in order to detect the fault case. For instance, at least one signal is exchanged for a software or hardware handshake.

If a fault is detected, a step 204 is carried out. Otherwise, step 202 is carried out. The case of fault is detected as a function of the signal level on interface circuit 112 between media access control 107 and monitoring logic 110.

In case of a fault, monitoring logic 110 triggers a reset of first physical interface 103 and second physical interface 105, by which first physical interface 103 and second physical interface 105 are started again.

In step 204, in the case of a fault, first physical interface 103 and second physical interface 105 are configured to transmit data via a third media-independent interface 111 between first physical interface 103 and second physical interface 105, without media access control 107. Upon starting, the at least one first communication parameter of first physical interface 103 is configured according to first electrical resistance configuration 113, and the at least one second communication parameter of second physical interface 105 is configured according to second electrical resistance configuration 114.

If for any reason the handshake between the MAC layer and the monitoring logic fails, e.g., because of a defect of the MAC layer μC/μP, a software error in the MAC layer or a defect or interruption of the power supply of data-distribution control unit 100, the reset of first physical interface 103 and of second physical interface 105, that is, of the two PHYs in the example, is then triggered by monitoring logic 110. They thereupon reboot and set their configuration parameters according to the resistance configuration. First physical interface 103 and second physical interface 105, that is, both PHYs in the example, are now in the back-to-back mode already described above. In spite of the failed MAC layer, the data are able to pass the gateway and are passed on to other network nodes.

Subsequently, in a step 205, it is checked whether the fault case still exists. If the fault case continues to exist, step 205 is carried out. Otherwise, step 202 is carried out.

A computer-program product may include a computer program with instructions, upon whose execution by a computer, the method described is carried out.

What is claimed is:

1. A method for operating an electronic data-distribution control unit for a media access to a medium for transmitting data, comprising:
    transmitting data from a first physical interface for a first port in the data-distribution control unit to a second physical interface for a second port in the data-distribution control unit via a first media-independent interface between a media access control in the data-distribution control unit and the first physical interface and via a second media-independent interface between the media access control and the second physical interface;
    detecting a fault in the media access control when a communication between the media access control and a monitoring logic in the data-distribution control unit fails; and
    in response to the fault, operating the monitoring logic to configure the first physical interface and the second physical interface to transmit data via a third media-independent interface between the first physical interface and the second physical interface, without the media access control.

2. The method as recited in claim 1, wherein the fault is detected as a function of a signal level on an interface circuit between the media access control and the monitoring logic.

3. The method as recited in claim 1, wherein:
    in response to the fault, operating the monitoring logic to trigger a reset of the first physical interface and the second physical interface in order to restart the first physical interface and the second physical interface,
    upon starting, at least one first communication parameter of the first physical interface is configured according to a first electrical resistance configuration, and at least one second communication parameter of the second physical interface is configured according to a second electrical resistance configuration.

4. The method as recited in claim 1, wherein the monitoring logic and the media access control exchanges at least one signal for a software or hardware handshake, in order to detect the fault.

5. An electronic data-distribution control unit for a media access to a medium for transmitting data, comprising:
    a first physical interface for a first port in the data-distribution control unit;
    a second physical interface for a second port in the data-distribution control unit;
    a first media-independent interface between the media access control and the first physical interface;
    a second media-independent interface between the media access control and the second physical interface;
    a third media-independent interface between the first physical interface and the second physical interface;
    a media access control, wherein the data-distribution control unit transmits data from the first physical interface to the second physical interface via the first media-independent interface between the media access control and the first physical interface and via the second media-independent interface between the media access control and the second physical interface; and a monitoring logic for detecting a fault in the media access control if a communication between the media access control and the monitoring logic in the data-distribution control unit fails, wherein the monitoring logic, in response to the fault, configures the first physical interface and the second physical interface to transmit data via the third media-independent interface between the first physical interface and the second physical interface, without the media access control.

6. The electronic data-distribution control unit as recited in claim 5, wherein the monitoring logic detects the fault as a function of a signal level on an interface circuit between the media access control and the monitoring logic.

7. The electronic data-distribution control unit as recited in claim 5, wherein:
the monitoring logic, in response to the fault, triggers a reset of the first physical interface and the second physical interface,
the first physical interface and the second physical interface restart owing to the reset,
the first physical interface, upon starting, configures at least one first communication parameter of the first physical interface according to a first electrical resistance configuration, and
the second physical interface, upon starting, configures at least one second communication parameter of the second physical interface according to a second electrical resistance configuration.

8. The electronic data-distribution control unit as recited in claim 5, wherein the monitoring logic and the media access control exchange at least one signal for a software or hardware handshake, in order to detect the fault.

9. The electronic data-distribution control unit as recited in claim 5, wherein:
the first physical interface includes at least two xMII interfaces,
the second physical interface includes at least two xMII interfaces, and
the at least two xMII interfaces of the first physical interface and the at least two xMII interfaces of the second physical interface are used in case of the fault.

10. A non-transitory machine-readable storage medium having program instructions that when executed by a computer result in a carrying out of a method for operating an electronic data-distribution control unit for a media access to a medium for transmitting data, the method comprising:
transmitting data from a first physical interface for a first port in the data-distribution control unit to a second physical interface for a second port in the data-distribution control unit via a first media-independent interface between a media access control in the data-distribution control unit and the first physical interface and via a second media-independent interface between the media access control and the second physical interface;
detecting a fault in the media access control when a communication between the media access control and a monitoring logic in the data-distribution control unit fails; and
in response to the fault, operating the monitoring logic to configure the first physical interface and the second physical interface to transmit data via a third media-independent interface between the first physical interface and the second physical interface, without the media access control.

11. The non-transitory machine-readable storage medium as recited in claim 10, wherein the fault is detected as a function of a signal level on an interface circuit between the media access control and the monitoring logic.

12. The non-transitory machine-readable storage medium as recited in claim 10, wherein:
in response to the fault, operating the monitoring logic to trigger a reset of the first physical interface and the second physical interface in order to restart the first physical interface and the second physical interface,
upon starting, at least one first communication parameter of the first physical interface is configured according to a first electrical resistance configuration, and at least one second communication parameter of the second physical interface is configured according to a second electrical resistance configuration.

13. The non-transitory machine-readable storage medium as recited in claim 10, wherein the monitoring logic and the media access control exchanges at least one signal for a software or hardware handshake, in order to detect the fault.

* * * * *